Patented Mar. 7, 1933

1,900,386

UNITED STATES PATENT OFFICE

JOSEPH NESTOR KUZMICK, OF PASSAIC, NEW JERSEY, ASSIGNOR OF ONE-HALF TO THE MANHATTAN RUBBER MANUFACTURING DIVISION OF RAYBESTOS-MANHATTAN, INC., OF PASSAIC, NEW JERSEY, A CORPORATION OF NEW JERSEY, AND ONE-HALF TO JOHN STOGDELL STOKES, OF SPRING VALLEY FARMS, PENNSYLVANIA

ABRASIVE PRODUCT AND METHOD OF MAKING THE SAME

No Drawing.  Application filed June 24, 1929. Serial No. 373,492.

This invention relates to the manufacture of various articles of bonded granular abrasive material and the method of making the same. Furthermore, this invention is directed to the production of articles such as grinding wheels, discs, segments, blocks, etc., wherein a synthetic resin product is utilized as the bond together with benzaldehyde commingled therewith in a particular manner to attain products of superior quality. It is also to be understood that my composition and method are suitable for the production of articles for use in filtration.

The chief object of my invention is to produce products of great tensile and transverse strength and having greatly improved flexibility whereby such discs or wheels will withstand considerable deflection from their normal shape without breaking or shattering.

Abrasive wheels are often required in a thickness not greater than 3/64", and as such wheels are operated at high speed and are often large in diameter, great strength and flexibility are highly desirable for this and other reasons. It is known, in accordance with U. S. Patent 942,808, granted December 7, 1909, to Leo H. Baekeland, that synthetic resins of the phenol-formaldehyde type could be employed in the production of abrasive wheels and the like by merely commingling such abrasive material with the phenolic condensation product, shaping the composition to suitable form and subsequently heating such wheels to harden the composition to its ultimate or infusible form. This patent also teaches the use of various aldehydes of higher boiling point than formaldehyde, such as, for example, oxytrimethylene and paraform. Furthermore, this patent states that other materials may be added thereto such as, for instance, solvents, dyes, pigments or other solid or liquid materials.

It is also known that condensation products of phenol and furfural can be made, that furfural may be used in excess of the equimolecular proportions, and that furfural is a desirable addition and hardening agent when added to synthetic resins, in accordance with teachings of Novotny and Kendall, U. S. Patents issued on November 22, 1921, Nos. 1,398,146 and 1,398,147; and issued March 19, 1929, Nos. 1,705,493, 1,705,495 and 1,705,496.

It is also known that furfural is a desirable addition to phenol-formaldehyde condensation products when used with abrasive material until such mixture acquires a uniform, sticky or tacky consistency or sludgelike mass in accordance with U. S. Patent 1,537,454 issued to Frank P. Brock on May 12, 1925. This patent also teaches the formation of a mixture of resin, furfural and abrasive materials which may be formed into various shapes such as abrasive discs either in hot or cold molds and which mixture may subsequently be hardened by heating until the ultimate infusible product is obtained. The mass in this case is thoroughly mixed to a uniform consistency in order to thoroughly dissolve the synthetic resin through the use of a solvent such as furfural, which solvent is subsequently capable of acting as a hardening agent in the final curing step. This patent also mentions the use of any aldehyde body or derivative which has a sufficiently high boiling point, say substantially above 100° C. Benzaldehyde is here mentioned as a product which could be used. In all cases, however, the mixture is thoroughly incorporated until the mass is in solution and acquires a uniform, sticky or tacky consistency.

It is also known that furfural is a useful solvent and hardening agent when used in accordance with the teachings of Harry C. Martin, U. S. Patent 1,626,246 of April 26, 1927. In this case the abrasive granules are first wetted with the furfural and the phenol-formaldehyde condensation product is added to the mix thereafter, whereby the resin granules are dissolved in the furfural. Such mass is preferably cold molded into a desired shape and subsequently heat treated to set the resin and the furfural contained therein to a final hard and infusible form. This latter method is the one at present practiced.

In studying the properties of various modifying agents a large number of solvents of both the high and low boiling type were tried and, in addition, various plasticizers, etc. Sample discs were made and tested and through these tests I have discovered that benzaldehyde produces a product of outstanding quality from the standpoint of strength and flexibility. I have endeavored to introduce the benzaldehyde into the mass of resin material, mixing the product thoroughly so as to produce a mass of material of uniform or sticky consistency, but have found that under these conditions benzaldehyde will not produce products of highest ultimate strength. I have found that it is necessary that the synthetic resin material be very finely ground to say a fineness of about two hundred mesh and that the benzaldehyde be added for the purpose of wetting the abrasive granules, whereupon this extremely fine, ground synthetic resin is gradually added, whereby the granules of abrasive material and resin are uniformly wetted and the resin particles are made tacky; but, on the other hand, the mixing is insufficient for the mass to acquire a uniform consistency and the benzaldehyde is retained in the resin system in a non-uniform and dispersed phase.

The product may be molded into form preferably in cold molds although heated molds can be used and subsequently the shaped product is given a heat treatment to harden the composition and to eliminate substantially all of the benzaldehyde, leaving the resinous mass without substantially plasticizing or modifying the same. I have found that this method of molding requires the use of a product which is a mild, high boiling, slow solvent for the resin and that the resin, in order to attain great strength, must be in a fine, ground condition permitting the benzaldehyde to readily wet the surfaces and to be dispersed within the resin mass while still in a condition of being freely liberated from such mass during the final curing operation.

Benzaldehyde is a relatively poor solvent for synthetic resins as, for example, those of the phenol-formaldehyde or phenol-furfural type. Furthermore, in the presence of basic catalysts the benzaldehyde does not readily form resinous products nor combine with them. I therefore consider it highly desirable that the potentially reactive resinous product which I am to use in my process contain or have added thereto a sufficient amount of a base such as ammonia, caustic soda, calcium oxide, or a carbonate such as potassium carbonate, in order that such product have at least slightly alkaline properties. Under these conditions I insure the elimination of the dispersed benzaldehyde.

If the benzaldehyde were thoroughly mixed with the resin until such mixture acquires a uniform, sticky or tacky consistency or sludgelike mass, it would be extremely difficult to eliminate such benzaldehyde and the resin mass itself would be lacking in final ultimate strength and flexibility.

The use of furfural as a solvent, plasticizer and hardening agent or merely as a wetting agent has been tried by me repeatedly and it has been found that furfural is altogether too reactive either in the presence of a base or acid type of resin and will, therefore, during the hardening of the resinous mass combine with such resinous product. Furthermore, furfural is a most excellent solvent for various types of synthetic resins including those of the phenol-aldehyde type. For this reason it is not possible to so manipulate the process as to maintain the furfural in a dispersed phase as it will immediately go into solution and produce a uniform, sticky and tacky mass. The subsequent hardening when furfural is present does not liberate the furfural to any appreciable extent and the product remains within the resin mass and detracts from the strength and flexibility, particularly when the mass is hardened to infusibility under conditions of atmospheric pressure.

Briefly, my product and method comprise the steps of

1. Wetting the granular material with a small quantity of benzaldehyde.

2. Subsequently wetting the surfaces of the synthetic resin with the benzaldehyde film uniformly spread over the granular material.

3. Forming such product into any desired shape as by means of pressure.

4. Heating the previously formed product at preferably gradually increasing temperatures in order that the benzaldehyde may be substantially eliminated from the resin mass; and secondly, simultaneously react the resinous bond preferably to its ultimate infusible stage.

Precautions are necessary to grind the resin product to a fineness of at least two hundred mesh, whereby the wetting of such minute granules by the wet abrasive granules will cause the resin in a relatively undissolved condition to adhere in a relatively thin and unaltered layer as a covering for the surfaces of the abrasive granules. Should the resin be coarsely ground the dispersion of the benzaldehyde will not be sufficiently uniform and the strength and flexibility of the product will suffer.

In order that my invention may be better understood, I am giving the following illustrative example:

Into a suitable mixing device such as is used in the making of abrasive wheels, as for example, a paddle type mixer, I place 350 grams of #54 silicon carbide, and with the paddles in operation at suitable speeds I introduce gradually 6 cc. of benzaldehyde. After mixing for a period of say five minutes, I add gradually 50 grams phenol-formaldehyde resin of the potentially reactive type. The mixer is operated for another five minutes after the last of the resin has been introduced, when it will be found that the resin is held on to the granules of silicon carbide because of the mutual wetting capacity of the benzaldehyde. The material is now removed from the mixer and should preferably be a fairly dry granular product with the resin particles uniformly distributed on the face of the granular silicon carbide and loosely adhering thereto because of the mutual wetting action of the benzaldehyde. The product is now placed into a suitable mold, leveled and pressed into the desired shape at a pressure varying somewhat with the nature of the work in hand but preferably about 2000 pounds to the square inch. This high pressure causes the finely ground phenol resin particles to be pressed into more intimate contact with the silicon carbide granules whereby the benzaldehyde is further dispersed within this finely divided powdery resinous material. These formed shapes, which may be in the form of discs or wheels, are preferably made without the interaction of heat, and upon removal from the preforming press are ready to be hardened. The hardening is done at gradually increasing temperatures, starting with say 175° F. and ending at 350° F. after the termination of five to twenty hours, dependent, of course, upon the shape and size of the objects being hardened.

This composition when made into the shape of a standard figure eight test piece of ½″ thickness and 1″ cross section, shows a tensile strength of 3000 pounds per square inch. A similar test piece made of a similar composition but substituting furfural for benzaldehyde shows a tensile strength of only 2350 pounds.

Deflection and transverse strengths are of great importance and these tests were made using my composition and including benzaldehyde in a dispersed phase, and likewise using the same composition and having furfural added to the abrasive granules in the same manner. Six separate batches were made with benzaldehyde and a similar number were made with furfural, using the proportions and the #54 silicon carbide abrasive granules called for in my example. Each of the twelve test pieces were made up into a test specimen 2″ wide by 5″ long and having the thickness as tabulated. The benzaldehyde product was far superior to the furfural product in both deflection and transverse strengths as indicated by each of the individual pieces tested and by the average of the lots. The tabulation follows:

| Specimen No. | Thickness—Inches | | | Deflection inches | W= Scale reading in lbs. Span= 4″ | Transverse strength lbs. per sq. in. |
|---|---|---|---|---|---|---|
| | 1 | 2 | Average | | | |
| Benzaldehyde | | | | | | |
| 1 | .197 | .204 | .2005 | .035 | 80 | 4780 |
| 2 | .197 | .202 | .1995 | .032 | 70 | 4200 |
| 3 | .205 | .195 | .200 | .036 | 70 | 4190 |
| 4 | .203 | .195 | .199 | .036 | 70 | 4240 |
| 5 | .208 | .198 | .203 | .033 | 80 | 4650 |
| 6 | .209 | .201 | .205 | .033 | 80 | 4550 |
| Average | | | .2011 | .0341 | | 4430 |
| Furfural | | | | | | |
| 1 | .192 | .198 | .195 | .031 | 30 | 1890 |
| 2 | .189 | .191 | .190 | .031 | 50 | 3320 |
| 3 | .201 | .197 | .199 | .030 | 50 | 3030 |
| 4 | .188 | .198 | .193 | .031 | 50 | 3220 |
| 5 | .187 | .191 | .189 | .033 | 50 | 3350 |
| 6 | .187 | .193 | .190 | .032 | 40 | 2660 |
| Average | | | .1926 | .0313 | | 2911 |

Although I prefer to use synthetic resins of the phenol-formaldehyde or phenol-furfural type as my bonding material, it is to be understood that other synthetic resins may be used instead as, for example, resins of the phenol-carbohydrate type or of the phenol-acetylene type or similar products of phenol and polyhydric alcohols such as glycerin. Moreover, it is not essential that the resin bond be necessarily made of a pure phenol body inasmuch as various bodies having phenolic properties such as the cresols, xylenols, resorcinol or other phenolic homologues or various mixtures of these may be used. It is also to be understood that other synthetic resins of a non-phenolic type are useful for my purpose, such as the resins of the glyptal type made, as for example, from glycerol and phthalic anhydride, or, for that matter, condensation products such as those of urea or thiourea or mixtures of these in combination with suitable aldehydic bodies such as formaldehyde, furfural, etc.

It is, of course, to be understood that the grain size of the abrasive material may be varied in accordance with the type of abrasive material to be produced and that various types of granular abrasive materials may be bonded by my method, and that as the nature of the abrasive material or its particle sizes vary, variations in the proportion of benzaldehyde and resin used may be necessary, dependent on the type of product I prefer to make. Similarly, the pressures used in forming the product may vary considerably, depending again on the nature and grain of the product being formed. It is, therefore, to be understood that wherein I have described illustratively certain preferred embodiments of my invention, I wish it to be understood that I do not limit myself to all the precise details in operation or proportion, as the examples given are by way of illustration only and modifications and variations may be made without departing from the spirit of the invention or exceeding the scope of the appended claims.

What I claim is—

1. An abrasive composition comprising, abrasive granules and synthetic resin wetted with benzaldehyde, the proportion of the benzaldehyde being low and of the order of 1½% by weight of the composition when using a fine grain of abrasive.

2. The herein described method of making a synthetic resin bonded abrasive composition comprising, coating the surface of granules of resin and abrasive with benzaldehyde, the proportion of the benzaldehyde being low and of the order of 1½% by weight of the composition when using a fine grain of abrasive.

3. An abrasive composition comprising, abrasive granules and synthetic resin mixed with benzaldehyde, the proportion of benzaldehyde in the mix being of the order of 1½% when using a fine grain of abrasive and being low enough and the mixing being just sufficient for the benzaldehyde to wet the abrasive granules and the resin and to be retained by the resin in a non-uniform and dispersed phase.

4. An abrasive composition comprising abrasive granules having finely ground synthetic resin of the order of 200 mesh mixed with benzaldehyde, the proportion of the benzaldehyde in the mix being of the order of 1½% by weight when using a fine grain of abrasive.

Signed at Passaic, in the county of Passaic and State of New Jersey this 14th day of June, A. D. 1929.

JOSEPH NESTOR KUZMICK.